Jan. 23, 1945.     R. O. HEIN     2,367,864
FILING MACHINE
Filed July 2, 1942     2 Sheets-Sheet 1
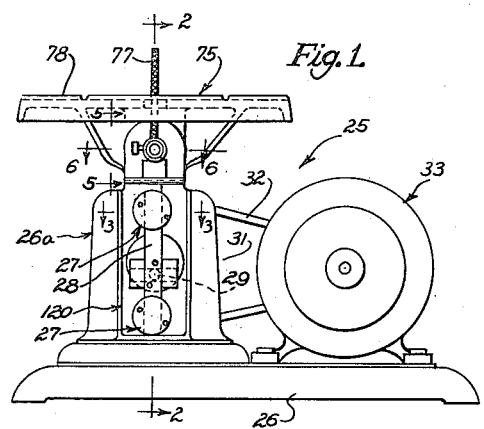
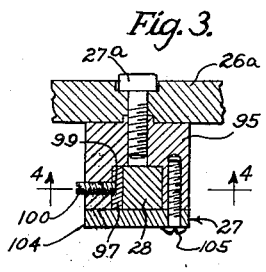
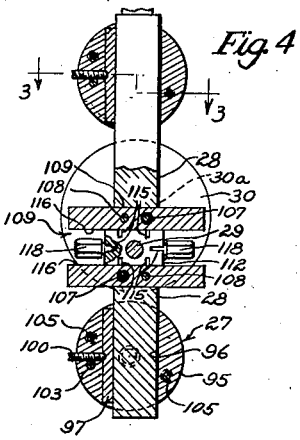
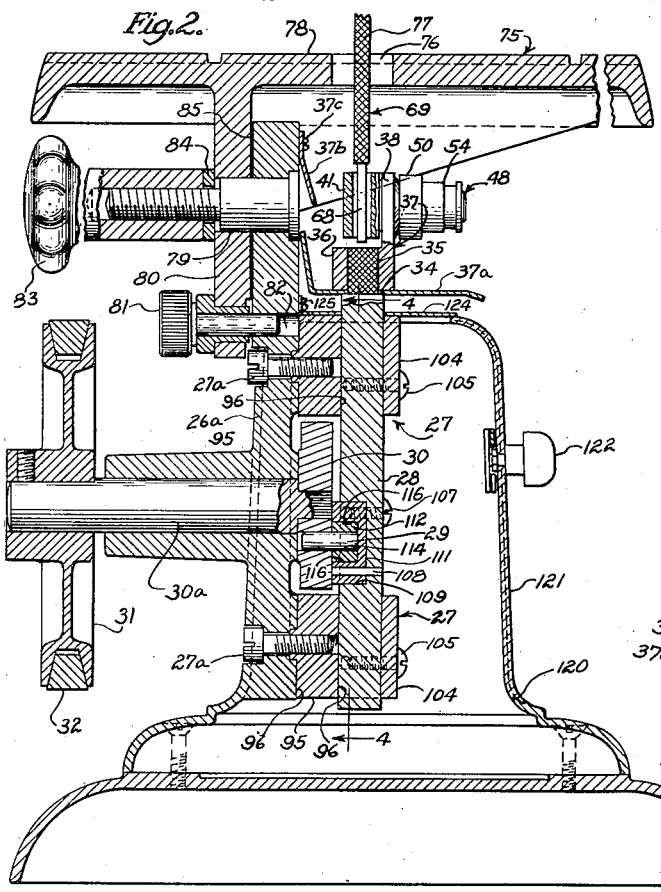
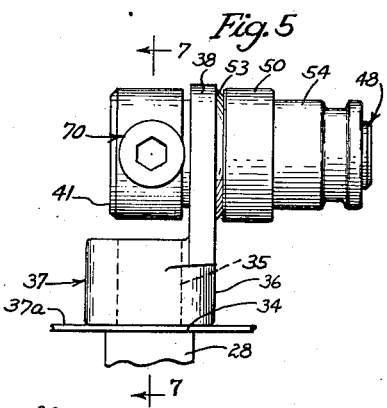
Inventor
Robert O. Hein
by Louis Sheldon
Atty.

Jan. 23, 1945.   R. O. HEIN   2,367,864
FILING MACHINE
Filed July 2, 1942   2 Sheets-Sheet 2
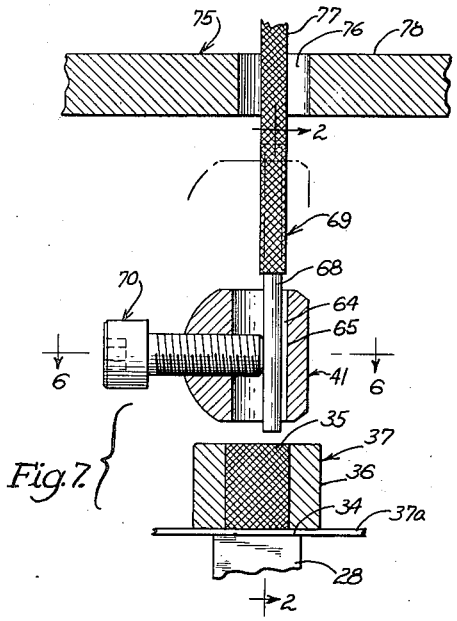
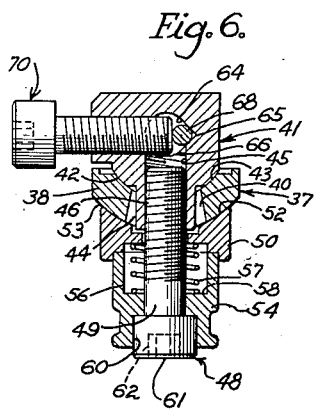
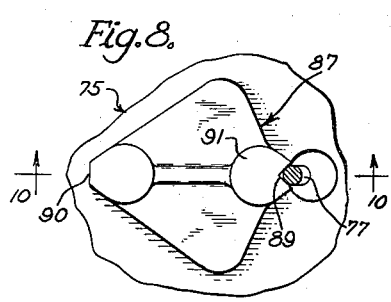
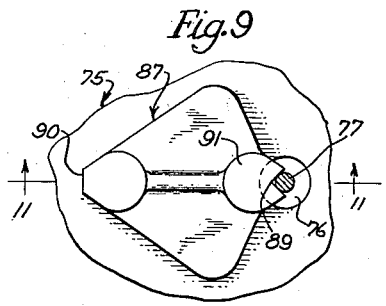
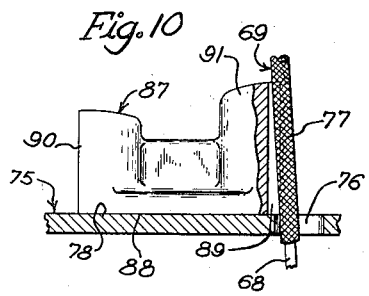
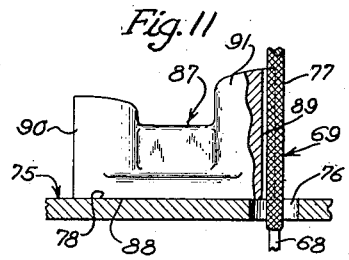
Inventor
Robert O. Hein
by Louis Sheldon
Atty.

Patented Jan. 23, 1945

2,367,864

UNITED STATES PATENT OFFICE 2,367,864

FILING MACHINE

Robert O. Hein, Chicago, Ill.

Application July 2, 1942, Serial No. 449,383

18 Claims. (Cl. 29—76)

This invention pertains to machine tools and is concerned more particularly with those, such as filing machines, using reciprocating cutting members.

One of the conventional types of filing machine used by tool and die makers, among others, has a reciprocating support provided with a fixed socket coaxial with the support for receiving the shank of a file, the working portion of which is adapted to project up through a hole in a table to operate upon a die or other piece of work on the table. Files used in the making of tools and dies are generally inaccurately formed, that is, the shank is generally not coaxial or parallel with the working portion, due to deformation in hardening, among other reasons, with the result that the working portion reciprocates in a path which is not coaxial or parallel with itself and thus the work must move back and forth with each stroke of the file in order to maintain contact the full length of the working portion, with consequent impairment in the accuracy which the making of tools and dies requires.

It is accordingly an object of my invention to provide a machine of this character enabling the cutting member to be so mounted as to perform its function efficiently and accurately.

A further object is to provide a mounting enabling the full length of the cutting member to be parallel with the reciprocating member of the machine.

Another object is to provide a mounting enabling the working portion of a file or the like to reciprocate along its own axis.

An additional object is to provide a machine of the character referred to with a tool socket in which the working portion of a file or other tool may be accurately positioned for service notwithstanding any disalinement of the shank and the working portion of the tool.

An additional object is to provide a machine of the character referred to with a tool socket which is universally adjustable relative to the actuating member carrying the same, whereby the working portion of a file or other tool may be accurately positioned for service notwithstanding any disalinement of the shank and the working portion of the tool.

A further object is to provide a device for enabling the operator to accurately adjust the socket to a position insuring the proper operation of the cutting member.

Another object is to provide a novel bearing shoe construction.

An additional object is to provide a novel means for preventing a screw from working loose.

Further objects and advantages of my invention will appear as the description proceeds.

The invention will be better understood upon reference to the following description and the accompanying drawings, wherein:

Fig. 1 is a reduced elevational view of an illustrative form of my invention.

Fig. 2 is a fragmentary sectional view taken as indicated by the line 2—2 in Figs. 1 and 7;

Fig. 3 is a fragmentary sectional view taken as indicated by the line 3—3 in Figs. 1 and 4;

Fig. 4 is a fragmentary sectional view taken as indicated by the line 4—4 in Fig. 2;

Fig. 5 is a fragmentary elevational view taken as indicated by the line 5—5 in Fig. 1;

Fig. 6 is a plan sectional view taken as indicated by the line 6—6 in Fig. 1;

Fig. 7 is a fragmentary sectional view taken as indicated by the line 7—7 in Fig. 5;

Figs. 8 and 9 are plan views showing how a setting square also constructed in accordance with my invention is used to properly position a filing tool mounted in accordance with the invention;

Figs. 10 and 11 are sectional-elevational views taken as indicated by the lines 10—10 in Fig. 8 and 11—11 in Fig. 9, respectively.

Referring now more particularly to the drawings, I have shown generally at 25 by way of example an embodiment of my invention in the form of a filing machine such as is used in the filing of tools and dies. The machine may comprise a base or support 26 and a housing 26a suitably mounted thereon. Vertical guides 27 mounted as at 27a on said housing receives a file-driving member 28 which is vertically reciprocated as by a crank 29 on a disc 30 fixedly carried by a shaft 30a rotating with a pulley 31 driven by a belt 32 from a motor 33.

The reciprocating member 28 has an upper shoulder 34 and a reduced upper end 35 above the shoulder, the end 35 preferably being knurled or otherwise roughened and receiving with a force fit a sleeve 36 of a file socket mounting member 37, said sleeve securing a chip guard 37a abutting the shoulder 34. A baffle 37b secured as at 37c to the housing cooperates with the guard 37a to protect the parts from filings. The mounting member 37 has an upwardly projecting spherically concave-convex boss or lug 38 with a central frusto-conically walled opening 40. A file shank receiving member 41 has a spherical convex or ball portion 42 slidably engageable with the concave surface 43 of the lug 38, said member having an extension 44 lying in the opening 40 for engagement with the frusto-conical wall thereof to limit angular adjustment of the shank-receiving member 41 relative to the mounting member 37. The ball portion 42 and extension 44 form a sleeve internally threaded as at 45, receiving the threaded end 46 of a clamp screw 48 whose stem 49 passes through a collar 50 having a spherically concave surface 52 cooperating with the convex surface 53 of the lug 38, said collar being slidable along but angularly movable with said stem. A sleeve 54 at the other side of the collar 50 slidably receives the stem 49 and is counterbored as at 56 for the reception of a spring 57 which is adapted to abut said collar and a shoulder 58 on said sleeve 54. The sleeve 54 is counterbored at the other side of the shoulder 58, as at 60, to receive the head 61 of the screw 48.

The head 61 has a wrench socket 62 enabling the operator to rotate the screw 48 in a direction away from the mounting member 37 so that the spring 57 may be free to yieldably permit the file socket member 41, screw 48, collar 50, sleeve 54 and spring 57 to be moved as a unit universally angularly relative to the mounting member to the extent determined by the clearance between the sleeve extension 44 of the file shank-receiving member 41 and the wall of the opening 40 in the mounting member.

The member 41 has a socket 64 generally alined with the sleeve 36 and having an angular side formed as by walls 65 and 66 against which the shank 68 of a file 69 is adapted to be thrust and securely held as by a set screw 70.

Mounted on the housing 26a is a table 75 having an opening 76 through which the working portion 77 of the file secured in the socket 64 is adapted to extend, for operating on the work to be supported on and slid over the top 78 of the table. The table may be immovably fixed, but preferably is pivotally or swivelly mounted as at 79, the table having a depending bracket or lug 80 for that purpose. Means such as a retractable pin 81 may be provided on the lug 80 for reception in an opening 82 in the housing 26a to secure the table at right angles to the path of reciprocation of the file. The table may also be secured frictionally in positions inclined to the aforesaid position by a tightening of a threaded hand knob 83 against a washer 84 engaging the lug 80, or otherwise, a friction washer 85 of fibre or other suitable material being employed if desired. The opening 76 in the table will of course afford clearance for the working portion of the file irrespective of the table's adjustment.

In operation, a file is projected, shank lowermost, down through the table opening 76 and the shank 68 fitted in the socket 64 whereupon the set screw 70 is tightened against the shank until the latter immovably engages the walls 65 and 66 of the socket. The working portion 77 of the file now is very likely non-parallel to the driving member 28 as explained above. If it by chance is parallel to the driving member, the ensuing procedure will make sure of such condition. The screw 48 is now retracted sufficiently to enable the file shank socket member 41 to be angularly adjusted by hand relative to the lug 38, while the spring 57 remains active to yieldably hold the parts in any such adjustment desired. A setting square 87 (Figs. 8 and 10) embodying features of my invention is now employed by the operator. This square has a flat smooth ground bottom surface 88 and a V-groove 89 and a flat wall 90, both at right angles to the surface 88, and is placed on the table with the surface 88 resting on the table top 77 and the V-groove 89 receiving the working portion 77 of the file, the relation of the parts being substantially that shown in Figs. 8 and 10. Now the operator, holding the boss 91, in which the V-groove 89 is formed, and the file portion 77 between his thumb and forefinger, slides the square 87 along the table until he feels or sees that the full lengths of the sides of the V-groove are engaged with the file, the file being shifted during this maneuver and thereby angling the member 41 relative to the lug 38. Holding the parts in this relation, the operator applies a socket wrench to the socket 62 and tightens the clamp screw 48 until the sleeve 54 is in tight engagement with the collar 50 and the universal or ball joint is rigid. Then, as a check for accuracy of setting, the operator may shift the setting square, placing the surface 90 thereof in contact with the file portion 77. If the adjustment proves inaccurate, the clamp screw 48 is loosened and the procedure repeated. I have found in practice that even an unskilled person can become adept almost immediately in obtaining the correct adjustment at the first try.

In the event it is desired to file at an inclination to the bottom of the work, such as to form clearance on dies, the table can be inclined to the desired extent and secured after the adjustment of the file as outlined above, as by pulling the pin 81 out of the hole 82, loosening the knob 83, tilting the table to the desired angle, and retightening the knob 83.

Each guide 27 may comprise a block 95 having a vertical slot 96 substantially wider than the reciprocating rod 28 and receiving a gib 97 having a dimple 99 receiving the end of a set screw 100. To prevent the set screw from working loose, I provide a hole 102 intersecting the threaded opening for the set screw and, after the screw is set, I drive a fibre or the like pin 103 in said hole 102 until the pin is embedded in the thread grooves in the screw so as to be meshed with the screw threads, thereby locking the screw in adjusted position. A cap plate 104 is attached to the block 95 as by screws 105, completing the rod guide 27.

Secured as by screws 107 and dowel pins 108 in a transverse slot 109 in the reciprocating rod 28 is a channel member 111 slidably receiving a bronze or other suitable bearing shoe 112 with a bore 114 rotatably receiving the crank pin 29. The shoe 112 is slotted as at 115 enabling it to yield and thereby avoid binding the channel surfaces 116 slidably engaged thereby, expanding screws 118 being provided to take up wear.

The housing 26a preferably has a front door opening 120 for the door 121 having a readily operated knob latch 122 enabling the door to be removed as shown in Fig. 1. Any suitable type of door and latch could of course be used. A cover plate 124 fastened to the housing as at 125 shields the interior of the housing from filings.

In the event a relatively slender file is used, suitable means may be provided to back up the working portion of the file in order to prevent the file from being pushed backward by the work, as is well known in the art by the use of an overarm device.

It is evident from the foregoing that I have provided simple yet accurate mechanism for insuring the proper mounting and efficient operation of a file in a filing machine for precision work.

Various modifications may suggest themselves to those skilled in the art without departing from the spirit of my invention, and hence, I do not wish to be restricted to the specific form shown or uses mentioned, except to the extent indicated in the appended claims, which are to be interpreted as broadly as the state of the art will permit.

I claim:

1. A filing machine comprising a support, a motor mounted on said support, a member guided by said support and reciprocated by said motor, a work supporting table on said support and having a hole, a universally adjustable file chuck carried by said member, a file secured in said chuck and projecting upward through said hole, means cooperative with said table and file to position said chuck with said file parallel with the path of reciprocation of said member, and means for securing said chuck in position.

2. In a machine, a tool mounting member of spherically concavo-convex cross-section with a central frusto-conical bore whose small end is at the concave surface, a tool chuck having a spherically convex surface engaging said concave surface and having an internally threaded cylindrical sleeve of substantially smaller diameter than the small end of said bore so as to be movable angularly within said bore, a collar having a spherically concave surface engaging the convex surface on said mounting member, a sleeve telescoped within and abutting said collar on the side opposite the concave surface of said collar, a screw embraced by said collar and having a head abutting the second sleeve on the side opposite said collar and having a stem threaded in said threaded sleeve, and a spring about said screw and held thereby under compression between said collar and said second sleeve, said screw being operative to loosen the engagement between said collar and second sleeve, said spring thereupon permitting relative angular adjustment between said member and the remaining structure and operative to yieldably maintain any desired adjustment, said screw being thereafter operative to tighten the engagement between said collar and second sleeve to such an extent as in effect to positively maintain the desired adjustment.

3. In a machine tool, a tool mounting member of spherically concavo-convex cross-section, a tool chuck having a spherically convex surface engaging said concave surface and having a threaded portion, a collar having a spherically concave surface engaging the convex surface on said mounting member, a collar abutting the first collar on the side opposite the concave surface of said first collar, a clamp member abutting said second collar and threaded to said portion, and a spring held by said mounting and clamp members under compression between said collars, said clamp member being operative to loosen the engagement between said collars, said spring thereupon permitting relative angular adjustment between said mounting member and said chuck and operative to yieldably maintain any desired adjustment, said clamp member being thereafter operative to tighten the engagement between said collars to such an extent as in effect to positively maintain the desired adjustment.

4. In a machine tool a pair of individual relatively movable members including a chuck, a chuck support between said members, said members being universally movable relative to said support, means yieldably clamping said members in any desired adjustment relative to said support, and means for positively maintaining said adjustment.

5. In a machine tool, a tool chuck support having opposed spherical surfaces, a tool chuck having a spherical surface nested with one of said surfaces of said support, a clamp member having a spherical surface nested with the other of said surfaces of said support, means for yieldably clamping said chuck and clamp member in any desired adjustment relative to said support, and means for positively maintaining said adjustment.

6. In a machine tool, a pair of members including a chuck, a chuck support between said members, said members being universally movable relative to said support, and means yieldably clamping said members in any desired adjustment relative to said support, said means including means for positively maintaining said adjustment.

7. A filing machine comprising a work table having a hole, a reciprocating member having a chuck for receiving the shank of a file adapted to project upward through said hole, and means mounting said chuck on said member for universal adjustment to an extent enabling the working portion of a file whose working portion is somewhat out of line with its shank to be secured parallel to the path of reciprocation.

8. In a filing machine, a work table having a plane top and a hole therethrough, a file chuck, means for reciprocating said chuck, said chuck being adapted to hold the shank of a file while the working portion of the file projects up through said hole, said chuck being universally adjustable to enable said working portion to extend parallel to the path of reciprocation, a setting square having a plane bottom for engagement with said table top and also having an elongated V-groove at a right angle to said bottom, the walls of said groove being engageable with said working portion and said square being shiftable on said table top to bring said walls and working portion into parallelism, said condition being determinable by feel when said square and portion are pressed together by the thumb and forefinger, and means for positively securing said chuck with said working portion so disposed.

9. In a filing machine, a work table having a plane top and a hole therethrough, a file chuck, means for reciprocating said chuck, said chuck being adapted to hold the shank of a file while the working portion of the file projects up through said hole, said chuck being universally adjustable to enable said working portion to extend parallel to the path of reciprocation, a setting square having a plane bottom for engagement with said table top and also having an elongated V-groove at a right angle to said bottom, the walls of said groove being engageable with said working portion and said square being shiftable on said table top to bring said walls and working portion into parallelism, said condition being determinable by feel when said square and portion are pressed together by the thumb and forefinger, and means for positively securing said chuck with said working portion so disposed, said square having a plane surface parallel to said groove for disposition against said working portion after such adjustment, to check the adjustment.

10. In a device of the class described including means providing parallel mutually facing bearing surfaces, a bearing shoe having parallel bearing surfaces for slidably engaging the aforesaid surfaces, with one or more transverse slots across at least one of said surfaces of said shoe, whereby said shoe is rendered resilient to preclude binding of said shoe against said means.

11. A filing machine comprising a support, a motor mounted on said support, a member guided by said support and reciprocated by said motor, a work supporting table on said support and having a hole, a universally adjustable file chuck carried by said member, a file secured in said chuck and projecting upward through said hole, means enabling said chuck to be adjusted to a position in which said file is parallel with the path of reciprocation of said member, and means for securing said chuck in said position.

12. In a machine, a tool mounting member of spherically concavo-convex cross-section, a tool chuck having a spherically convex surface engaging the concave surface of said mounting member and having a threaded portion, a collar having a spherically concave surface engaging the convex surface of said mounting member, a sleeve abutting said collar on the side opposite the concave surface of said collar, a screw embraced by said collar and having a head abutting said sleeve on the side opposite said collar and having a stem threaded to the threaded portion of said chuck, and a spring about said screw and held thereby under compression between said collar and said sleeve, said screw being operative to loosen the engagement between said collar and sleeve, said spring thereupon permitting relative angular adjustment between said mounting member and the remaining structure and operative to yieldably maintain any desired adjustment, said screw being thereafter operative to tighten the engagement between said collar and sleeve to such an extent as in effect to positively maintain the desired adjustment.

13. In a machine, a tool mounting member of spherically concavo-convex cross-section, a tool chuck having a spherical surface engaging one of the concave and convex surfaces of said mounting member and having a threaded portion, a collar having a spherical surface engaging the other of said surfaces on said mounting member, a collar abutting the first collar on the side opposite said mounting member, a clamp member abutting said second collar and threaded to said threaded portion, and a spring held by said mounting and clamp members under compression between said collars, said clamp member being operative to loosen the engagement between said collars, said spring thereupon permitting relative angular adjustment between said mounting member and said chuck and operative to yieldably maintain any desired adjustment, said clamp member being thereafter operative to tighten the engagement between said collars to such an extent as in effect to positively maintain the desired adjustment.

14. In a machine, a tool mounting member having opposed spherical surfaces, a tool chuck having a spherical surface engaging one of the spherical surfaces of said mounting member and having a threaded portion, a collar having a spherical surface engaging the other of said spherical surfaces of said mounting member, a sleeve abutting said collar on the side opposite said spherical surface of said collar, a screw embraced by said collar and having a head abutting said sleeve on the side opposite said collar and having a stem threaded in the threaded portion of said chuck, and a spring about said screw and held thereby under compression between said collar and said sleeve, said screw being operative to loosen the engagement between said collar and said sleeve, said spring thereupon permitting relative angular adjustment between said mounting member and the remaining structure and operative to yieldably maintain any desired adjustment, said screw being thereafter operative to tighten the engagement between said collar and sleeve to such an extent as in effect to positively maintain the desired adjustment.

15. In a machine, a tool mounting member having opposed spherical surfaces, a tool chuck having a spherical surface engaging one of the spherical surfaces of said mounting member and having a threaded portion, a collar having a spherical surface engaging the other of said spherical surfaces on said mounting member, a collar abutting the first collar on the side opposite said mounting member, a clamp member abutting said second collar and threaded to said threaded portion, and a spring held by said mounting and clamp members under compression between said collars, said clamp member being operative to loosen the engagement between said collars, said spring thereupon permitting relative angular adjustment between said mounting member and said chuck and operative to yieldably maintain any desired adjustment, said clamp member being thereafter operative to tighten the engagement between said collars to such an extent as in effect to positively maintain the desired adjustment.

16. A filing machine, comprising a work table having a hole through which a file is adapted to project, a file mounting member having opposed spherical surfaces, a file chuck having a spherical surface engaging one of the spherical surfaces of said mounting member and having a threaded portion, a collar having a spherical surface engaging the other of said spherical surfaces on said mounting member, a sleeve abutting said collar on the side opposite said spherical surface of said collar, a screw embraced by said collar and having a head abutting said sleeve on the side opposite said collar and having a stem threaded in the threaded portion of said chuck, a spring about said screw and held thereby under compression between said collar and said sleeve, screw screw being operative to loosen the engagement between said collar and said sleeve, said spring thereupon permitting relative angular adjustment between said mounting member and the remaining structure and operative to yieldably maintain any desired adjustment, said screw being thereafter operative to tighten the engagement between said collar and sleeve to such an extent as in effect to positively maintain the desired adjustment, said chuck being disposed to receive a file adapted to project upward freely into said hole for service in contact with a work piece on said table, and means for reciprocating said mounting member to cause the file to reciprocate up and down in said hole.

17. A filing machine, comprising a work table having a hole through which a file is adapted to project, a file mounting member having opposed spherical surfaces, a file chuck having a spherical surface engaging one of the spherical surfaces of said mounting member and having a threaded portion, a collar having a spherical surface engaging the other of said spherical surfaces of said mounting member, a collar abutting the first collar on the side opposite said mounting member, a clamp member abutting said second collar and threaded to said threaded portion, and a spring held by said mounting and clamp members under compression between said collars, said clamp member being operative to loosen the engagement between said collars, said spring thereupon permitting relative angular adjustment between said mounting member and said chuck and operative to yieldably maintain any desired adjustment, said clamp member being thereafter operative to tighten the engagement between said collars to such an extent as in effect to positively maintain the desired adjustment, said chuck being disposed to receive a file adapted to project upward freely into said hole for service in contact with a work piece on said table, and means for reciprocating said mounting member to cause the file to reciprocate up and down in said hole.

18. An article of manufacture, comprising a setting square having a base with a plane bottom adapted for sliding contact with a plane work table and having spaced upstanding posts, each post having a work-engaging portion at right angles to said bottom, a web upstanding from said base and joined to said posts, said web serving as a pinch portion to be straddled by the thumb and index finger of one hand to facilitate the holding and moving of said article, said posts and base projecting laterally from both sides of said web to provide bottom and upstanding bearing surfaces engageable by said thumb and finger for enabling the operator to firmly press said article flat against said table top and either of said work-engaging portions laterally into engagement with the work to be squared, one of said work-engaging portions being V-grooved for squaring a rounded piece of work and the other work-engaging portion being planar for checking the result achieved by use of the V-grooved portion.

ROBERT O. HEIN.